INVENTOR.
DALE M. MATTHEWS
BY Bacon & Thomas
ATTORNEYS

United States Patent Office 3,664,829
Patented May 23, 1972

3,664,829
METHOD AND COLLECTOR FOR EXTRACTING METALS FROM AN AQUEOUS SOLUTION
Dale M. Matthews, Mountain View, Alaska (Drawer 8869, Mountain View Station, Anchorage, Alaska 99504)
Continuation-in-part of application Ser. No. 658,502, Aug. 4, 1967. This application Jan. 7, 1970, Ser. No. 1,202
Int. Cl. C22b 11/04, 15/12
U.S. Cl. 75—108
5 Claims

ABSTRACT OF THE DISCLOSURE

Metals belonging to a group of metals having an affinity for phosphorus are extracted from an aqueous solution by exposing phosphorus to said solution, said metals collecting on the phosphorus and later being separated therefrom. To provide a large contact area the phosphorus is melted onto a nonreactive matrix, and to prevent pollution of the aqueous solution by the phosphorus the matrix is enclosed in an envelope of non-reactive filter material.

---

This is a continuation-in-part of U.S. patent application Ser. No. 658,502, filed Aug. 4, 1967, now U.S. 3,498,674.

BACKGROUND OF THE INVENTION

(1) Field of the invention

The present invention relates generally to the recovery of certain metals, including gold and platinum, from an aqueous solution, and in particular to a method and apparatus for extracting minute particles of such metals from water runoff from a mining operation, seawater, and the like.

(2) Description of the prior art

The extraction of finely divided gold, platinum and certain other metals from an aqueous solution has long been considered desirable, but until the present invention no economically sound method for so doing has been devised.

Thus, the present invention is believed to be unique in providing an economically sound solution to a long pondered problem.

SUMMARY OF THE INVENTION

It has been discovered that certain metals, including gold, silver, platinum, copper and palladium, have an affinity for phosphorus, and that finely divided particles of these metals can be extracted from an aqueous solution in which they are suspended merely by contacting the aqueous solution with white or yellow phosphorus (commonly called "stick phosphorus"). This principle is utilized in the present invention to effect the economical recovery of such metals.

In the preferred embodiment of the invention, the phosphorus is first melted onto a nonreactive matrix, to provide a large contact area. The matrix is then enclosed within an envelope of nonreactive filter material, the pores of which are sufficiently small to prevent escape of flakes and particles of the phosphorus into the aqueous solution being treated, whereby phosphorus contamination of such liquids is avoided. This avoidance of contamination is a necessity when the liquid being treated is drawn from and returned to waterways, if danger to fish and other marine life is to be avoided.

The envelope containing the matrix is then exposed to the metal-bearing aqueous solution, whereupon even very minute particles of the metals attach to the phosphorus to form a coating thereon. After a suitable coating has built up on the matrix, a separation step is undertaken.

The preferred method for removing or separating the deposited metal from the phosphorus is to heat the matrix sufficiently to melt the phosphorus, whereupon separation of the metals from the molten phosphorus can be effected by known methods. In some instances it is also possible to simply plane the deposited metals from the matrix.

The separated metals are then treated to remove all phosphorus therefrom. This can be done by use of a suitable solvent or solvents. An alternative method is to simply expose the separated metals to the air, whereupon any phosphorus clinging to the metallic particles will be burned away automatically. Using the latter method, and by controlling the amount of phosphorus clinging to the metallic particles, it is further possible to generate sufficient heat to melt the metals, whereby the molten metals can be drained off, separated, and cast into ingots of relatively pure content.

Caution must be used in carrying out the invention, to be certain that the phosphorus is submerged at all times in water or other inert environment that will prevent combustion thereof until the separation stage when combustion may be desirable. Further, care should be taken so that the phosphorus does not contact the skin, to avoid the disease known as "phossy jaws."

It is the principal object of the present invention to provide an economically feasible method for recovering minute particles of gold and certain other metals from an aqueous solution.

A further object is to provide a collector designed to expose a large surface area of phosphorus to an aqueous solution, and provided with means to prevent contamination of the solution by the phosphorus.

Other objects and many of the attendant advantages of the invention will be readily apparent from the following Description of the Preferred Embodiment, when taken together with the accompanying drawings.

DESCRIPTION OF THE PREFERRED EMBODIMENT

Figure 1:
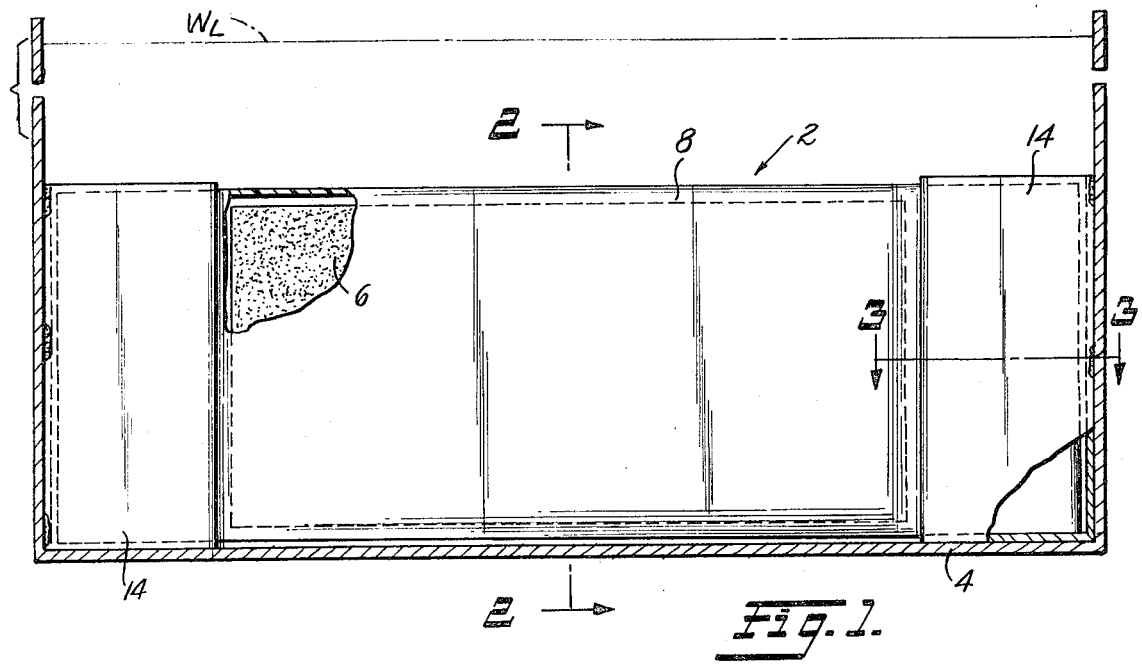
FIG. 1 is a fragmentary transverse sectional view through a trough, showing the present collector in operative position therein.
Figure 3:
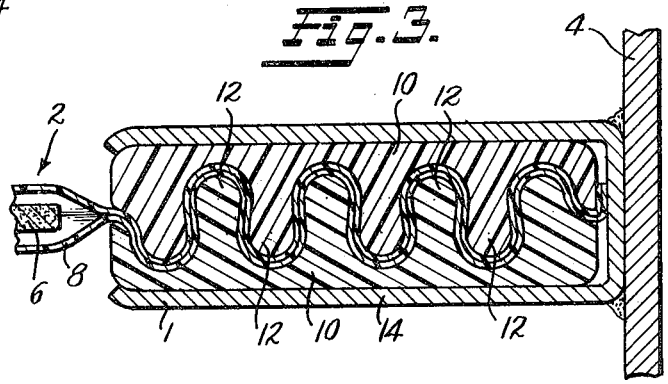
FIG. 3 is an enlarged horizontal sectional view taken on the line 3—3 of FIG. 1.
Figure 2:
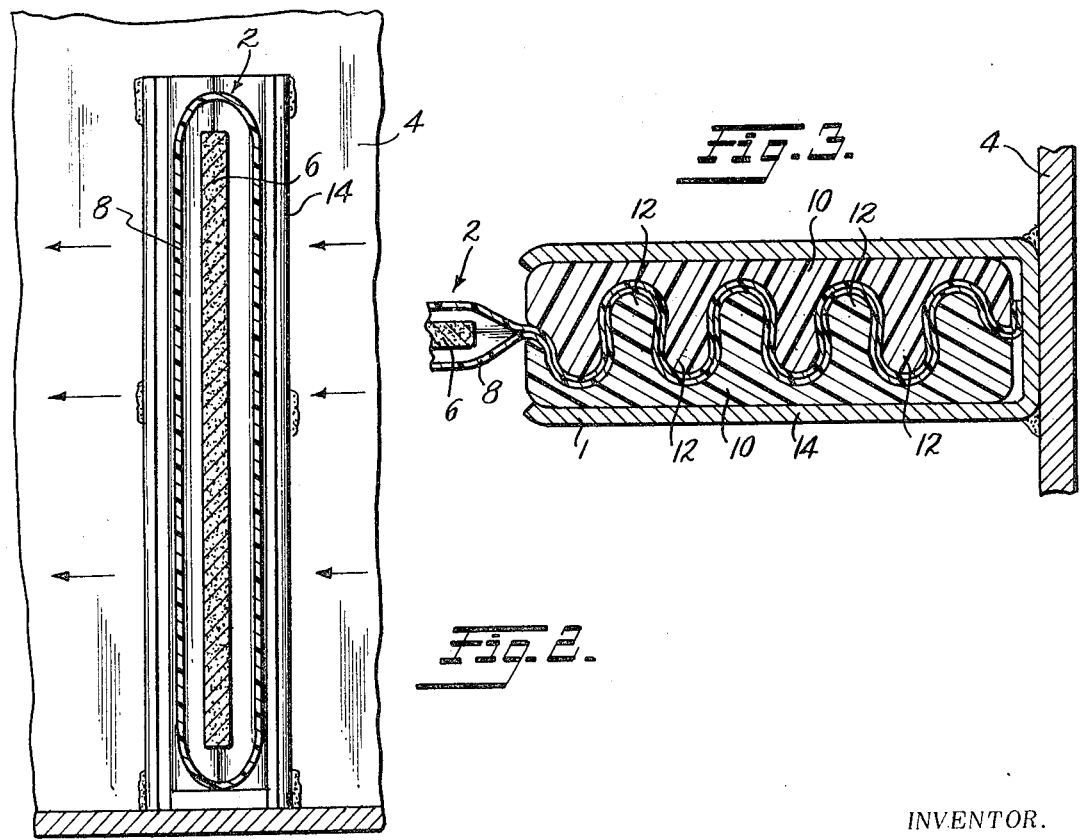
FIG. 2 is an enlarged fragmentary vertical sectional view through the collector, taken on the line 2—2 of FIG. 1.

The present invention contemplates treating any aqueous solution containing colloidal and/or dissolved values of certain metals with phosphorus, to remove the metal values by deposition on the surface of the phosphorus. With this expedient even minute amounts of dissolved metals, from the group comprising gold, silver, platinum, copper and palladium, can be extracted or recovered economically from aqueous solutions, including those previously wasted or thought to be so low in concentration as to make further treatment useless. The application of this process to cationic and sols extraction of gold dissolved in an aqueous liquid is accomplished in the following manner, the same process being similarly applied to recover any of the metals of said group.

White or yellow phoesphorus (commonly called "stick phosphorus") is exposed to the gold-containing aqueous liquid in such manner that the phosphorus is at no time exposed to air or oxygen, or other reactive gas or liquid, but so that it is able to act upon the aqueous liquid and be acted upon by it. Contact methods for accomplishing this are well known in the art, and a unique collector designed for optimum results will be described hereafter. After a suitable time of induction, the resulting phosphorus, covered with deposited metal foil, is bathed or washed in pure or distilled water until deemed clean, and then is heated, under water, to a temperature sufficient to melt the phosphorus, which may then be separated by known methods from the metal encrustations, blebs, blobs, and particles that have formed thereupon.

The molten phosphorus is then poured into suitable containers and cooled to "stick" form suitable for reuse, and the metallic residue is further cleansed by treatment with an organic solvent like carbon disulfide, ether, or any other suitable phosphorus solvent, or any combination of them. At no time is the phosphorus, or the phosphorus-containing collected materials, allowed access to oxygen or exposed to the air or other reactive material until phosphorus removal is complete, unless such is desired for a reason to be described hereafter. The solvent liquid is used until it is "spent," or ineffective for further digestion, and is then disposed of in a suitable manner that will avoid pollution.

The extraction action is due to the strong affinity phosphorus has for gold in any from, even in extreme dilutions, an affinity which is also present though to a lesser extent for the other metals of said group. The "stick" phosphorus (white or yellow) will be found to have formed upon its surface an encrustation of metals of said group, collected from the aqueous solution. This extraction treatment can be practiced periodically upon the waste or recycled waters from any workable placer deposit (or others), in order to allow dissolved or colloidal metal values to be displaced, or it may be continuous in action.

By treating aqueous solutions according to the invention, values of said metals, and especially gold, which in the past have not been recovered can be extracted at very low cost. The aqueous solution or liquid can be that resulting from pumping and retrieving water and reagent into a deposit, or it can be liquid withdrawn from an abandoned and flooded mine, or even seawater.

In some instances, particularly where the metallic deposit is substantial and the surface of the phosphorus is regular, the collected foil can be at least partially removed simply by planing with suitable equipment. Care must be taken here, as always when handling phosphorus, to avoid exposure to air so that ignition of the phosphorus does not occur.

If desired, a selected amount of phosphorus can be left on the metallic deposit while such is being removed from the main body of phosphorus. Then, by exposing the metallic deposit carrying phosphorus particles to the air to effect ignition of the phosphorus, the fierce heat of the burning phosphorus can be utilized to melt the metal. The molten metals can then be easily separated, if different metals are present, and can be cast into molds.

Referring now to the drawings, a collector designed to optimize the practice of the present invention is shown at 2, mounted within a trough 4 for passing aqueous solution to the collector. The collector 2 includes a matrix 6 made of a non-reactive material onto which molten phosphorus is poured and allowed to harden. The result is a matrix 6 having a large exposed surface area of phosphorus. Any suitable nonreactive material can be used for the matrix 6, for example, tetrafluoroethylene (Teflon) or nylon. The surface area of the phosphorus coating on the matrix can be made larger by utilizing a matrix with holes or pores therein, the melted phosphorus being poured on the matrix so that the walls of said holes or pores are coated therewith. If a porous matrix is carefully coated with phosphorus, a relatively large area of phosphorus can be presented to an aqueous solution.

The matrix 6 is received within an envelope sleeve 8 made of nonreactive filter material having a pore size sufficiently small to prevent escape of any particles of phosphorus that might flake from the matrix 6. Such particles could pollute the aqueous solution and be a danger to wildlife, if allowed to escape into the solution in sufficient quantity. Any suitable nonreactive filter material can be used for the envelope sleeve 8 for example nylon or Teflon (tetrafluoroethylene). The size of the pores can be varied so long as flakes of phosphorus are prevented from passing therethrough. As an example of a suitable pore size, filter material with a pore size of from about five to about ten microns will achieve the desired results.

The ends of the envelope 8 are closed by pairs of clamps 10 made of a resilient, nonreactive material, for example, nylon, each clamp having rounded ribs 12 thereon that are received between similar ribs 12 on a mating clamp. The mated pairs of clamps 10 are received within holders 14 mounted in the trough 4.

The matrix 6 after phosphorus impregnation must, of course, be handled at all times to keep air away therefrom. With the collector 2 in assembled condition, it is exposed to a liquid solution containing metal values, the solution and suspended values passing through the protective sleeve 8 and contacting with the exposed phosphorus on the matrix 6. After a suitable period, the matrix 6 is removed from the envelope, and deposited metal values are separated from the phosphorus by planing and/or melting. If the phosphorus is melted, then the matrix 6 is reimpregnated before it is again placed in the protective envelope 8.

The method of the present invention, and in particular that method as practiced with the unique collector 2, makes economically feasible the safe recovery of finely divided, minute values of metals of the group listed hereinabove, especially gold, from aqueous solution. Obviously, many modifications and variations are possible.

I claim:

1. The method for extracting a suspended metal from an aqueous liquid wherein said metal is selected from the group consisting of gold, silver, platinum, copper, and palladium, which comprises the steps of:
    (a) contacting phosphorus with the aqueous liquid in such manner that the phosphorus is not exposed to oxygen or any other reactive agent, so that the metal is collected in the phosphorus;
    (b) separating the collected metal from the phosphorus by melting the phosphorus in an inert environment to free the collected metal; and
    (c) cleaning the separated metal to remove any remaining phosphorus therefrom by bathing the collected and separated metal in a suitable solvent or by exposing the collected metal and any phosphorus particles thereon to oxygen, whereby the phosphorus ignites and is consumed.

2. The method as recited in claim 1, wherein said step of contacting includes immersing into said aqueous liquid a matrix of nonreactive material, the exposed surface of said filter material carrying said phosphorus whereby to maximize the contact area.

3. The method of claim 2, wherein said matrix is enclosed within an envelope of nonreactive filter material having a pore size sufficiently small to prevent escape of phosphorus particles flaking from the matrix.

4. The method for extracting a dissolved metal from an aqueous liquid, said metal being selected from the group consisting of gold, silver, platinum, copper and palladium, comprising the steps of: contacting phosphorus with said aqueous solution in such manner that said phosphorus is not exposed to oxygen or any other reactive agent, so that said metal is deposited on the phosphorus; melting the resulting phosphorus under water to separate it from the deposited metal; and cleaning the separated metal deposit with a suitable solvent to remove any remaining phosphorus therefrom.

5. The method as recited in claim 4, wherein said solvent is an organic solvent.

References Cited

UNITED STATES PATENTS

| | | | |
|---|---|---|---|
| 1,880,538 | 10/1932 | Waggaman et al. | 23—223 |
| 1,375,441 | 4/1921 | Baudin | 75—108 |
| 2,048,152 | 7/1936 | Wise et al. | 75—83 |
| 3,498,674 | 3/1970 | Matthews | 299—5 X |

L. DEWAYNE RUTLEDGE, Primary Examiner
G. T. OZAKI, Assistant Examiner

U.S. Cl. X.R.

75—117, 118, 121